United States Patent
Kruglick

(10) Patent No.: US 9,619,168 B2
(45) Date of Patent: Apr. 11, 2017

(54) MEMORY DEDUPLICATION MASKING

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 184 days.

(21) Appl. No.: 14/376,125

(22) PCT Filed: Nov. 8, 2013

(86) PCT No.: PCT/US2013/069238
§ 371 (c)(1),
(2) Date: Jul. 31, 2014

(87) PCT Pub. No.: WO2015/069280
PCT Pub. Date: May 14, 2015

(65) Prior Publication Data
US 2015/0134829 A1  May 14, 2015

(51) Int. Cl.
*G06F 3/06* (2006.01)
*H04L 29/08* (2006.01)
(Continued)

(52) U.S. Cl.
CPC ............ *G06F 3/0641* (2013.01); *G06F 3/067* (2013.01); *G06F 3/0608* (2013.01); *G06F 12/08* (2013.01);
(Continued)

(58) Field of Classification Search
CPC ...... G06F 3/0641; G06F 3/067; G06F 3/0608; G06F 9/45558; G06F 2009/45583;
(Continued)

(56) References Cited

U.S. PATENT DOCUMENTS 5,182,805 A    1/1993  Campbell
8,327,059 B2  12/2012  Chen et al.
(Continued)

OTHER PUBLICATIONS

International Search Report and Written Opinion in International Patent Application No. PCT/US2013/069238, mailed May 2, 2014.
(Continued)

*Primary Examiner* — Ruolei Zong
(74) *Attorney, Agent, or Firm* — Turk IP Law, LLC

(57) ABSTRACT

Technologies are generally described for virtual machine memory deduplication protection through memory deduplication masking. In some examples, a virtual machine manager (VMM) that receives data to be written to memory may initially write the data to entries in a temporary shadow paging table and then subsequently opportunistically update the memory and an associated hardware-assisted paging (HAP) table. Upon receiving a read request for the received data before the data has been written to the memory, the VMM may check the HAP table and determine that the requested data is not available from the memory. Upon determining that the received data is not available from the memory, the VMM may respond to the read request by sending the received data stored in the shadow paging table entries.

19 Claims, 7 Drawing Sheets

(51) Int. Cl.
G06F 12/08 (2016.01)
G06F 9/455 (2006.01)
(52) U.S. Cl.
CPC .............. *H04L 67/1008* (2013.01); *G06F 2009/45583* (2013.01); *G06F 2212/152* (2013.01)
(58) Field of Classification Search
CPC ......... G06F 12/1009; G06F 2212/657; G06F 12/1036; G06F 3/061; H04L 67/1008; H04L 9/3242; H04L 49/70
USPC ........................................................ 709/226
See application file for complete search history.

(56) References Cited

U.S. PATENT DOCUMENTS

| | | | |
|---|---|---|---|
| 8,479,198 B2 | 7/2013 | Hayakawa et al. | |
| 8,813,240 B1 | 8/2014 | Northup | |
| 8,930,647 B1* | 1/2015 | Smith | G06F 9/44557 711/103 |
| 9,166,988 B1 | 10/2015 | Shin et al. | |
| 2006/0161719 A1* | 7/2006 | Bennett | G06F 9/45533 711/6 |
| 2006/0259734 A1* | 11/2006 | Sheu | G06F 12/1036 711/203 |
| 2007/0067435 A1 | 3/2007 | Landis et al. | |
| 2008/0005447 A1* | 1/2008 | Schoenberg | G06F 12/109 711/6 |
| 2008/0244573 A1 | 10/2008 | Sahita et al. | |
| 2010/0223432 A1 | 9/2010 | Eidus et al. | |
| 2010/0250895 A1 | 9/2010 | Adams et al. | |
| 2011/0047543 A1 | 2/2011 | Mohinder | |
| 2012/0102285 A1 | 4/2012 | Savagaonkar et al. | |
| 2012/0265959 A1 | 10/2012 | Le et al. | |
| 2013/0132690 A1 | 5/2013 | Epstein | |
| 2013/0174148 A1 | 7/2013 | Amit et al. | |
| 2013/0283004 A1* | 10/2013 | Devine | G06F 12/1009 711/206 |
| 2014/0108701 A1* | 4/2014 | Liljeberg | G06F 12/1441 711/6 |
| 2015/0052614 A1 | 2/2015 | Crowell et al. | |
| 2015/0178497 A1 | 6/2015 | Lukacs et al. | |

OTHER PUBLICATIONS

Jason, "Rapid Virtualization Indexing (RVI)," posted on Mar. 8, 2009, Accessed at http://www.boche.net/blog/index.php/2009/03/08/rapid-virtualization-indexing-rvi/, Accessed on Jul. 28, 2014, pp. 4.
Riley, R. et al., "Guest-Transparent Prevention of Kernel Rootkits with VMM-Based Memory Shadowing," Lecture Notes in Computer Science vol. 5230, pp. 1-20 (2008).
Ristenpart, T. et al., "Hey, You, Get Off of My Cloud: Exploring Information Leakage in Third-party Compute Clouds," In Proceedings of the 16th ACM Conference on Computer and Communications Security, pp. 199-212 (2009).
Suzaki, K. et al., "Effects of Memory Randomization, Sanitization and Page Cache on Memory Deduplication," EUROSEC'12, pp. 6 (2012).
Suzaki, K. et al., "Memory Deduplication as a Threat to the Guest OS," In Proceedings of the Fourth European Workshop on System Security, vol. 1, pp. 6 (2011).
Waldspurger, C.A. et al., "Memory Resource Management in VMware ESX Server," Symposium on Operating Systems Principles (OSDI), pp. 181-194 (2002).
Wang, X. et al., "Selective Hardware/software Memory Virtualization," In ACM SIGPLAN Notices, vol. 46, No. 7, pp. 217-226 (2011).

Wood, T. et al., "Memory Buddies: Exploiting Page Sharing for Smart Colocation in Virtualized Data Centers," In Proceedings of the 2009 ACM SIGPLAN/SIGOPS International Conference on Virtual Execution Environments, pp. 31-40 (2009).
"Malware morphs to greater numbers," accessed at http://web.archive.org/web/20081204195149/http://www.securityfocus.com/brief/763, published on Jun. 25, 2008, pp. 2.
"Triumfant Launches Memory Process Scanner Module to Detect and Stop In-Memory Attacks," accessed at http://www.prnewswire.com/news-releases/triumfant-launches-memory-process-scanner-module-to-detect-and-stop-in-memory-attacks-230489601.html, Nov. 4, 2013, pp. 3.
Chouchane, R., et al., "Detecting machines-morphed malware variants via engine attribution," Journal of Computer Virology and Hacking Techniques, vol. 9, Issue 3, pp. 137-157 (Aug. 2013).
Constantin, L., "Java-based Web attack installs hard-to-detect malware in RAM," accessed at http://www.infoworld.com/article/2619544/intrusion-detection/java-based-web-attack-installs-hard-to-detect-malware-in-ram.html, Mar. 19, 2012, pp. 4.
Jones, M.T., "Memory de-duplication in the Linux kernel," Anatomy of Linux Kernel Shared Memory, pp. 1-9 (Apr. 7, 2010).
King, T.S., et al., "Debugging operating systems with time-traveling virtual machines," USENIX 2005 Annual Technical conference, pp. 1-15 (2005).
Paul, "Ephemeral In-Memory Malware Common At High Value Targets," accessed at http://web.archive.org/web/20131104214636/https://securityledger.com/2013/11/ephemeral-in-memory-malware-common-at-high-value-targets/, posted on Nov. 4, 2013, pp. 4.
"Data deduplication," Accessed at http://web.archive.org/web/20130814121017/http://en.wikipedia.org/wiki/Data_deduplication, Accessed on Aug. 14, 2013, pp. 8.
"Linux 2 6 32,"Released on Dec. 3, 2009, Accessed at http://web.archive.org/web/20131020013524/http://kernelnewbies.org/Linux_2_6_32, Accessed on Oct. 20, 2013, pp. 14.
"Performance Evaluation of Intel EPT Hardware Assist," Accessed at http://web.archive.org/web/20130630101842/http://www.vmware.com/resources/techresources/10006, Accessed on Jun. 30, 2013, p. 1.
"What exactly do shadow page tables (for VMMs) do?," Accessed at http://stackoverflow.com/questions/9832140/what-exactly-do-shadow-page-tables-for-vmms-do, Accessed on Mar. 22, 2012, pp. 2.
Suzaki, K. et al., "Software Side Channel Attack on Memory Deduplication," Accessed at https://staff.aist.go.jp/c.artho/papers/SOSP11-Poster-Web.pdf, Accessed on Feb. 10, 2013, pp. 2.
"Attacks happen," accessed at http://web.archive.org/web/20130525040021/http://www.triumfant.com/default.asp, accessed on May 25, 2013, p. 1.
"JIT spraying," accessed at http://web.archive.org/web/20130709041137/http://en.wikipedia.org/wiki/JIT_spraying, accessed on Jul. 9, 2013, pp. 2.
"Linux/mm/ksm.c," accessed at http://web.archive.org/web/20130726082000/http://lxr.free-electrons.com/source/mm/ksm.c, accessed on Jul. 26, 2013, pp. 32.
"Memory Protection Constants," accessed at http://web.archive.org/web/20130928040424/http://msdn.microsoft.com/en-us/library/windows/desktop/aa366786(v=vs.85).aspx, accessed on Sep. 28, 2013, pp. 4.
"Signature-Less Malware Detection Detect, Analyze Respond," accessed at http://web.archive.org/web/20131105104713/http://www.emc.com/security/rsa-ecat.htm, accessed on Nov. 5, 2013, pp. 2.
Alperovitch, D., "Crowdstrike Technology," accessed at http://web.archive.org/web/20130918020506/http://www.crowdstrike.com/technology/index.html, accessed on Sep. 18, 2013, pp. 2.
Griffiths, N., "Active, Memory Deduplication," accessed at https://www.youtube.com/watch?v=r2CGKOWHUss&list=PL6EC2185E401DFE7A&index=4, accessed on Oct. 12, 2011, pp. 2.

* cited by examiner

COMPUTER PROGRAM PRODUCT 700

SIGNAL BEARING MEDIA 702

704 AT LEAST ONE OF

ONE OR MORE INSTRUCTIONS TO WRITE A FIRST DATA TO AN ENTRY IN A SHADOW PAGING TABLE IN RESPONSE TO RECEIVING A WRITE REQUEST TO WRITE THE FIRST DATA TO A MEMORY;

ONE OR MORE INSTRUCTIONS TO RECEIVE A READ REQUEST FOR THE FIRST DATA FROM A DATACENTER CUSTOMER;

ONE OR MORE INSTRUCTIONS TO DETERMINE, BASED ON A HARDWARE-ASSISTED PAGING (HAP) TABLE, THAT THE FIRST DATA IS NOT AVAILABLE FROM THE MEMORY; AND

ONE OR MORE INSTRUCTIONS TO RESPOND TO THE READ REQUEST BY SENDING THE FIRST DATA FROM THE ENTRY IN THE SHADOW PAGING TABLE TO THE DATACENTER CUSTOMER IN RESPONSE TO DETERMINATION THAT THE FIRST DATA IS NOT AVAILABLE FROM THE MEMORY.

| COMPUTER-READABLE MEDIA 706 | RECORDABLE MEDIA 708 | COMMUNICATIONS MEDIA 710 |

FIG. 7

MEMORY DEDUPLICATION MASKING

CROSS-REFERENCE TO RELATED APPLICATION

This Application is the U.S. National Stage filing under 35 U.S.C. §371 of PCT Application Ser. No. PCT/US13/69238 filed on Nov. 8, 2013. The PCT application is hereby incorporated by reference in its entirety.

BACKGROUND

Unless otherwise indicated herein, the materials described in this section are not prior art to the claims in this application and are not admitted to be prior art by inclusion in this section.

Data deduplication refers to the practice of using hashes or other semi-unique identifiers to identify portions of identical data and replacing those portions with pointers to a single stored master copy of the data portion. By collapsing such duplicated data into a single copy and pointers to that single copy, large and even substantial amounts of memory space may be freed. In network or cloud-based applications, deduplication may allow an operating system or application to be served as multiple instances to multiple customers while using about as much memory as a single instance of the operating system or application. As a result, a given amount of memory may serve substantially more customers when data deduplication is used compared to when data deduplication is not used.

SUMMARY

The present disclosure generally describes techniques for masking memory deduplication datacenters.

According to some examples, methods may be provided to mask memory deduplication in a datacenter. An example method may include writing a first data to an entry in a shadow paging table in response to receiving a write request to write the first data and receiving a read request for the first data from a datacenter customer. The method may further include determining that the first data is not available from a memory based on a hardware-assisted paging (HAP) table and sending the first data from the entry in the shadow paging table to the datacenter customer in response to determination that the first data is not available from the memory.

According to other examples, a virtual machine manager (VMM) may be provided to mask memory deduplication in a datacenter. The VMM may include a processing module and a memory configured to store a shadow paging table and a hardware-assisted paging (HAP) table and coupled to the processing module. The processing module may be configured to receive a write request to write a first data, write the first data to an entry in the shadow paging table, receive a read request for the first data from a datacenter customer, and determine, based on the HAP table, that the first data is not available from a memory. The processing module may be further configured to respond to the read request by sending the first data from the entry in the shadow paging table to the datacenter customer in response to determination that the first data is not available from the memory.

According to further examples, a system may be provided to mask memory deduplication. The system may include at least one virtual machine (VM) operable to be executed on one or more physical machines, a memory configured to store deduplicated data, a memory configured to store a shadow paging table and a hardware-assisted paging (HAP) table, and a controller. The controller may be configured to receive a write request to write a first data to the memory, write the first data to an entry in the shadow paging table, receive a read request for the first data from a customer, and determine, based on the HAP table, that the first data is not available from the memory. The controller may further be configured to respond to the read request by sending the first data from the entry in the shadow paging table to the customer in response to determination that the first data is not available from the memory.

According to yet further examples, a computer readable medium may store instructions for masking memory &duplication in a datacenter. The instructions may include writing a first data to an entry in a shadow paging table in response to receiving a write request to write the first data and receiving a read request for the first data from a datacenter customer. The instructions may further include determining that the first data is not available from a memory based on a hardware-assisted paging (HAP) table and sending the first data from the entry in the shadow paging table to the datacenter customer in response to determination that the first data is not available from the memory.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a block diagram of an example computer program product, all arranged in accordance with at least some embodiments described herein.

DETAILED DESCRIPTION

Figure 1:
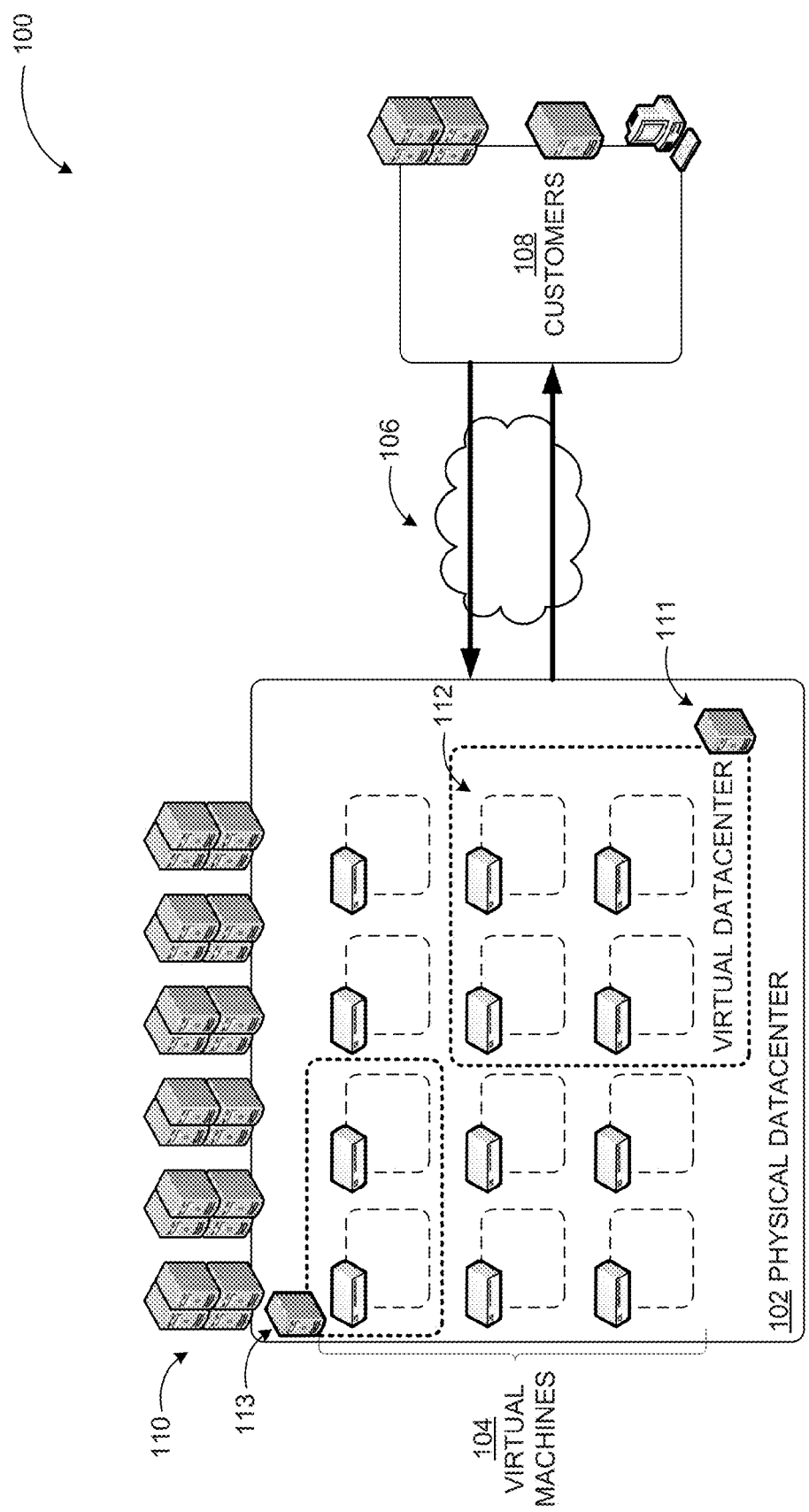
FIG. 1 illustrates an example datacenter-based system where masking of memory deduplication may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to protection of virtual machine memory deduplication from side channel attacks through memory deduplication masking at datacenters.

Briefly stated, technologies are generally described for virtual machine memory deduplication protection through memory deduplication masking. In some examples, a virtual machine manager (VMM) that receives data to be written to memory may initially write the data to entries in a temporary shadow paging table and then subsequently opportunistically update the memory and an associated hardware-assisted paging (HAP) table. Upon receiving a read request for the received data before the data has been written to the memory, the VMM may check the HAP table and determine that the requested data is not available from the memory. Upon determining that the received data is not available from the memory, the VMM may respond to the read request by sending the received data stored in the shadow paging table entries.

While some embodiments are discussed herein in conjunction with datacenters for illustration purposes, embodiments are not limited to datacenter-based applications. Some embodiments may be implemented in single-machine configurations such as individual computing devices or even smart phones, where virtualization may be employed. For example, micro-VMs may be employed in individual computing devices for security purposes, where embodiments may be implemented to enhance security through memory deduplication masking.

A datacenter as used herein refers to an entity that hosts services and applications for customers through one or more physical server installations and one or more virtual machines executed in those server installations. Customers of the datacenter, also referred to as tenants, may be organizations that provide access to their services for multiple users. One example configuration may include an online retail service that provides retail sale services to consumers (users). The retail service may employ multiple applications (e.g., presentation of retail goods, purchase management, shipping management, inventory management, etc.), which may be hosted by one or more datacenters. Thus, a consumer may communicate with those applications of the retail service through a client application such as a browser over one or more networks and receive the provided service without realizing where the individual applications are actually executed. This scenario contrasts with configurations where each service provider would execute their applications and have their users access those applications on the retail service's own servers physically located on retail service premises. One result of the networked approach described herein is that applications and virtual machines on a datacenter may be vulnerable to side channel attacks that take advantage of memory &duplication to preserve memory resources.

FIG. 1 illustrates an example datacenter-based system where masking of memory deduplication may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

Network or cloud-based applications may use data deduplication to provide multiple instances of an operating system or application to multiple users from a single instance of the operating system and/or application, thereby serving more users with the same memory. For example, an instance of an operating system or application may use a particular file, library, or application programming interface (API), but may not modify that data during execution. Multiple instances of the operating system/application may then be served using pointers to a single copy of the data. Deduplication may be used for both files (i.e., data stored on a hard disk drive, solid-state drive, tape drive, and the like) and data in memory (i.e., data used by currently-executing operating systems or applications, typically stored in random-access memory and the like). In the present disclosure, masking of memory deduplication is described in the context of data in memory, but the same techniques may be applicable to files.

Figure 2:
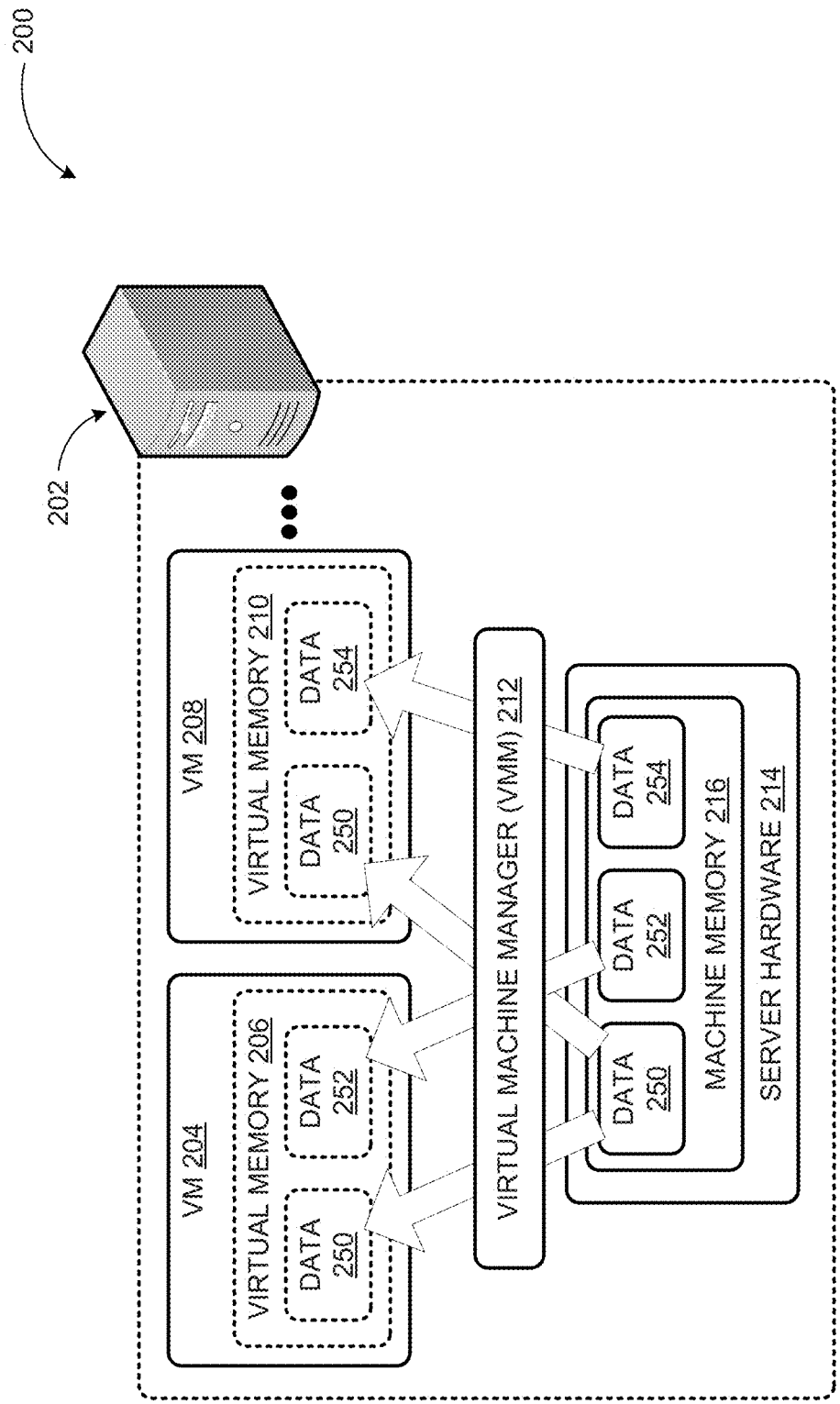
FIG. 2 illustrates an example system at a datacenter where memory deduplication may he implemented.

FIG. 2 illustrates an example system at a datacenter where memory deduplication may be implemented, arranged in accordance with at least some embodiments described herein.

According to a diagram 200, a physical server 202 (similar to the physical servers 110, 111, and 113) includes server hardware 214 and a machine memory 216 for storing deduplicated data, and may be configured to execute a first virtual machine (VM) 204 and a second VM 208. The VMs 204 and 208 may each execute one or more operating systems and/or applications, each of which may store or retrieve data from memory (e.g., the machine memory 216). For example, the VM 204 may have an associated virtual memory 206 which stores a data 250 and a data 252, each of which may be associated with an operating system or application executing on the VM 204. Similarly, the VM 208 may have an associated virtual memory 210 that stores the data 250 and a data 254, each of which may be associated with an operating system or application executing on the VM 208. The data 250 and 252 associated with the VM 204, while appearing to be stored in the virtual memory 206, may actually be data pointers that refer to a single copy of the data 250 and the data 252 stored at the machine memory 216. Similarly, the data 250 and 254 in the virtual memory 210 may actually be data pointers that refer to the copies of the data 250 and the data 254 stored at the machine memory 216. As a result, data that is common to both VMs, such as the data 250, can be stored as a single copy of the data 250 at the machine memory 216 and pointers to that copy of the data 250 at each of the virtual memories 206 and 210.

Virtual memory may be supported by operating systems so that an application or process executing on the operating system can access the entire available memory space. For example, an operating system may maintain a group of page tables that map virtual memory addresses to memory addresses for each application or process. In a non-virtualized environment (i.e., where a computer executes a single operating system), memory addresses may correspond to actual machine memory addresses (i.e., addresses of the memory on the computer hardware).

On the other hand, in a virtualized environment as depicted in the diagram 200, each of the VMs 204 and 208 may execute a different, "guest" operating system instance. Each guest operating system instance may maintain a group of page tables that map guest virtual memory addresses to guest memory addresses, as described above. However, since each guest operating system actually executes in a guest virtual machine (e.g., the VMs 204/208), the guest memory addresses may not correspond to actual machine memory addresses, in contrast to the non-virtualized example described above. Instead, the memory seen by each operating system instance may be virtualized and further mapped to memory addresses at the machine memory 216. For example, the virtual memory 206 associated with the VM 204 may appear to store the data 250 and 252. An application executing at the VM 204 may access the data 250 and/or 252 using guest virtual memory addresses, which an operating system executing at the VM 204 may translate to guest memory addresses. Subsequently, a virtual machine manager (VMM) 212 may either translate the guest memory addresses or the original guest virtual memory addresses to machine memory addresses at the machine memory 216, where the data 250 and 252 are actually stored.

As described above, memory deduplication may allow an operating system or application to be served as multiple instances to multiple users while using significantly less memory than a system in which deduplication is not used. As such, memory deduplication may be desirable for network or cloud service providers, such as datacenters. However, using memory deduplication may make datacenters susceptible to side channel attacks based on data access timing. For example, data that is deduplicated may exist as a single copy that serves multiple VMs. When a particular VM attempts to write to that data, another copy of that data may first be generated before the write is performed (also known as "copy-on-write"). As a result, the write access time for deduplicated data may be greater than the write access time for data that is not deduplicated due to the additional time required to generate the copy in the copy-on-write process. An attacker may then use this write access time difference to determine whether some particular data was deduplicated by another VM. This type of attack may be used for cloud cartography to determine what tasks are running where, co-location detection to determine if a specific target user is co-located with an attacker VM, and even for direct side channel attacks. In one specific scenario, an attacker may email a corporate target a graphics file with a unique binary representation and use attack VMs scattered through a datacenter to detect deduplication of the image and thus locate machines where the target receives or opens the image, allowing a highly-targeted attack.

Figure 3:
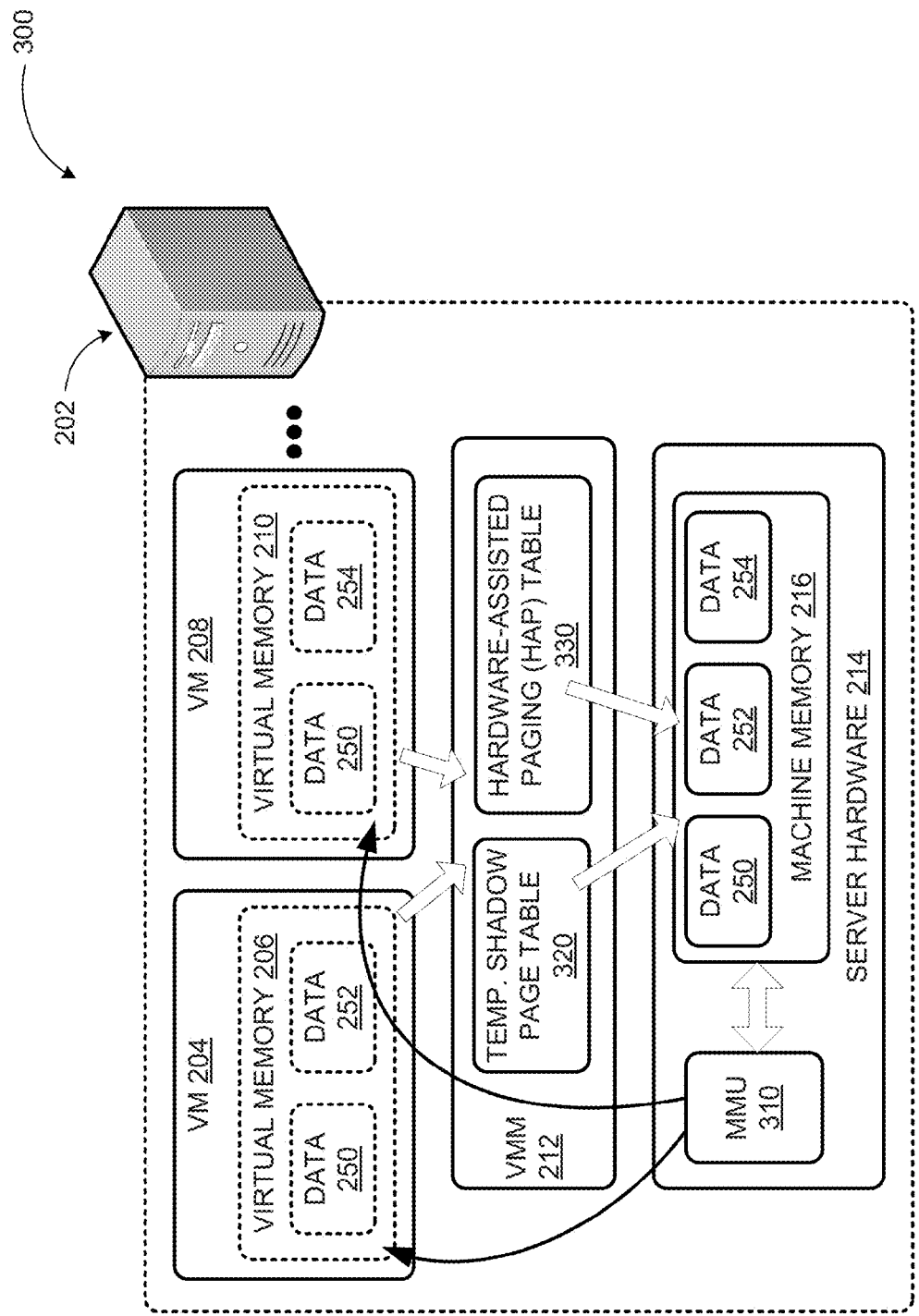
FIG. 3 illustrates an example system at a datacenter where masking of memory deduplication may be implemented.

FIG. 3 illustrates an example system at a datacenter where masking of memory deduplication may be implemented, arranged in accordance with at least some embodiments described herein.

A diagram 300 of FIG. 3 shares some similarities with the diagram 200 in FIG. 2, with similarly-numbered elements behaving similarly. According to the diagram 300, the server hardware 214 may include a memory management unit (MMU) 310 that manages the mapping of guest virtual memory addresses to machine memory addresses. In some embodiments, the MMU 310 may manage this mapping in conjunction with the VMM 212. The VMM 212 may perform memory virtualization based on techniques such as para-virtualization, shadow paging-based full virtualization, and hardware-assisted full virtualization. In para-virtualization, the guest operating system may be modified to be able to communicate directly with the VMM 212 and thereby access machine memory. Para-virtualization may need the guest operating system to be modified to be aware of its virtualization, and as such may introduce additional difficulties in the virtualization process. In shadow paging-based full virtualization, the VMM 212 may maintain a shadow page table that maps guest virtual addresses to machine addresses while the guest operating system may maintain its own virtual-to-physical address translation table. Since the VMM 212 may store what is essentially an additional set of full page tables, shadow paging-based virtualization may be memory-intensive. Moreover, in hardware-assisted full virtualization, the MMU may maintain a guest page table that translates between virtual addresses and physical addresses, while specialized hardware at the server hardware 214 maintains page tables that translate between physical addresses and machine addresses. These tables may be collectively known as a hardware-assisted paging (HAP) table, and may effectively map virtual addresses to machine addresses. Using hardware-assisted virtualization and HAP tables may allow guest VMs to handle their own page faults or errors without triggering VM exits, as well as avoid the memory-intensive nature of shadow paging-based virtualization.

In order to defeat side channel attacks using write access timing as described above, the VMM 212 may combine memory virtualization techniques. For example, the VMM 212 may maintain a temporary shadow page table 320 and a HAP table 330. The temporary shadow page table 320 may be used to respond to requests for just-written data, and the HAP table 330 may be used to respond to other data requests, as described below in more detail in FIG. 4.

Figure 4:
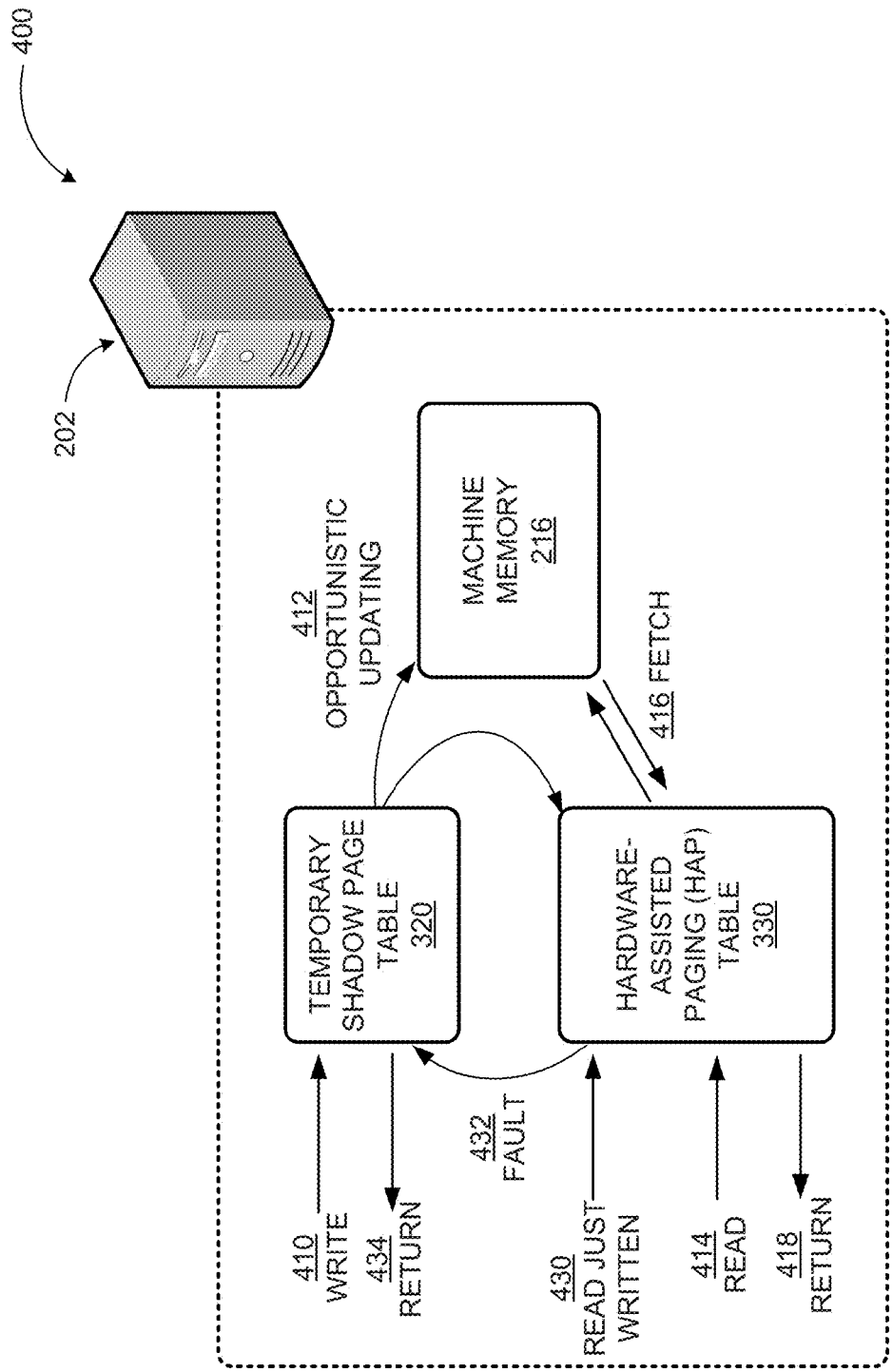
FIG. 4 illustrates how the system of FIG. 3 may be used to mask memory deduplication at the datacenter.

FIG. 4 illustrates how the system of FIG. 3 may be used to mask memory deduplication at the datacenter, arranged in accordance with at least some embodiments described herein.

As depicted in a diagram 400, the physical server 202 may include a machine memory 216 (as part of the server hardware 214), a temporary shadow page table 320 maintained by the VMM 212, and a hardware-assisted paging (HAP) table 330, also maintained by the VMM 212. A VM associated with a customer (e.g., of the datacenter) may request a write 410 to the machine memory 216. For example, the write 410 may contain a modified version of deduplicated data stored at the machine memory 216. In some embodiments, the deduplicated data may be associated with an operating system and/or an application. Upon receiving the write 410, the VMM 212 may create a new entry at the temporary shadow paging table 320 and store the write 410 in the newly-created entry. Subsequently, the VMM 212 may update the machine memory 216 and the HAP table 330 based on entries in the temporary shadow page table 320. For example, the VMM 212 may create a copy of the original, deduplicated data at the machine memory 216, write the modified data to the copy, and then update the HAP table 330 based on the copy. In some embodiments the VMM 212 may perform an opportunistic updating 412 of the machine memory 216 and the HAP table 330. For example, the VMM 212 may decide to perform the opportunistic updating 412 upon determination that it has sufficient time or processing capability to perform the updating or if the temporary shadow page table 320 has reached a particular size. After performing the opportunistic updating 412, the VMM 212 may then delete the corresponding entries in the temporary shadow page table 320, thus keeping the size of the temporary shadow page table 320 relatively small.

A VM associated with the same or a different customer may also request a read 414 of data stored at the physical server 202. Upon receiving the read 414, the VMM 212 may use the HAP table 330 to look up the requested data from the machine memory 216. In response to determination that the data is present in the machine memory 216, the VMM 212 may then use the HAP table 330 to first retrieve the data and then send it back from the machine memory 216 to the requesting VM in a return 418.

In some embodiments, a VM associated with the same or a different customer may request a read 430 of data that has just been sent to the VMM 212 in a previous write. For example, a VM may request the read 430 for the modified version of the data stored at the machine memory 216 written by the write 410. In this situation, the VMM 212 may not have performed the opportunistic updating 412 of the machine memory 216 and the HAP table 330. As a result, the modified data in the write 410 may still reside in an entry in the temporary shadow page table 320, and the machine memory 216 may still only contain the original deduplicated data. When the VMM 212 attempts to use the HAP table 330 to look up and retrieve the modified data in the write 410, the attempt may trigger a fault 432, because the modified data in the write 410 has not yet been written to the machine memory 216. In response to the fault 432, the VMM 212 may then look up and retrieve the data in the write 410 from its entry in the temporary shadow page table 320, then send the data in the write 410 to the requesting VM in a return 434. By sending the data from the temporary shadow page table 320, the VMM 212 may not have to create and modify a copy of the original deduplicated data in response to the read 430 and incur the write access delay associated with the copy-on-write process. As a result, a requesting VM may not observe a write access time delay for the data that was just written, and any access time delays due to data deduplication may be masked.

Figure 5:
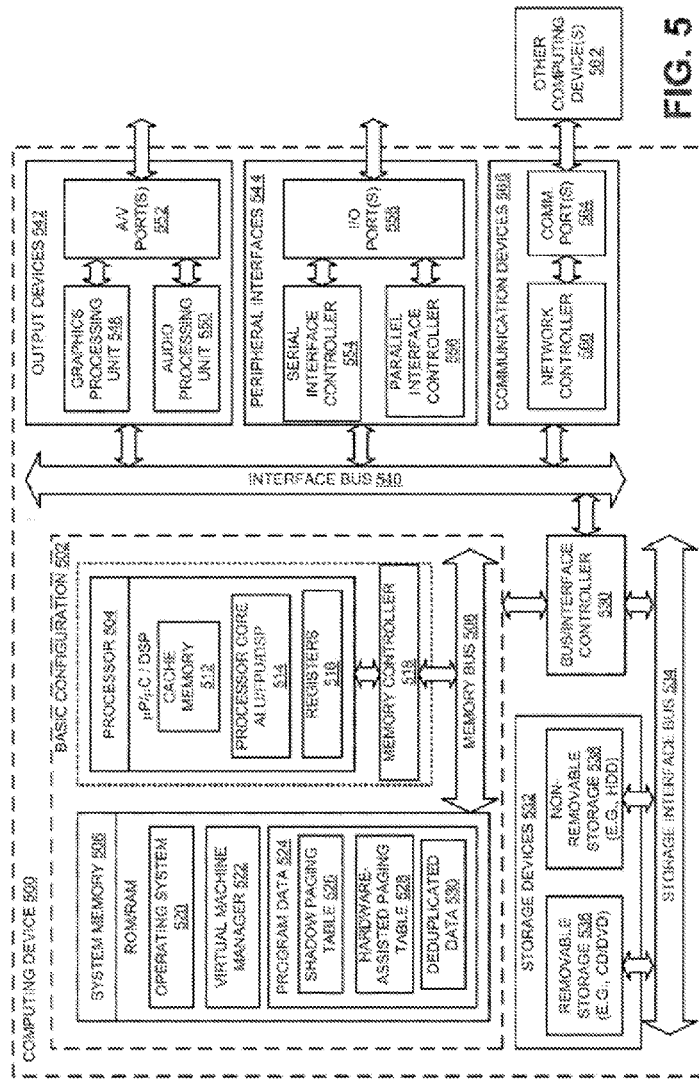
FIG. 5 illustrates a general purpose computing device, which may be used to provide memory deduplication masking in a datacenter.

FIG. 5 illustrates a general purpose computing device, which may be used to provide memory deduplication masking in a datacenter, arranged in accordance with at least some embodiments described herein.

For example, the computing device 500 may be used to mask memory deduplication in a datacenter as described herein. In an example basic configuration 502, the computing device 500 may include one or more processors 504 and a system memory 506. A memory bus 508 may be used to communicate between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a virtual machine manager 522, and program data 524. The program data 524 may include, among other data, a shadow paging table 526, a hardware-assisted paging table 528, deduplicated data 530, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Figure 6:
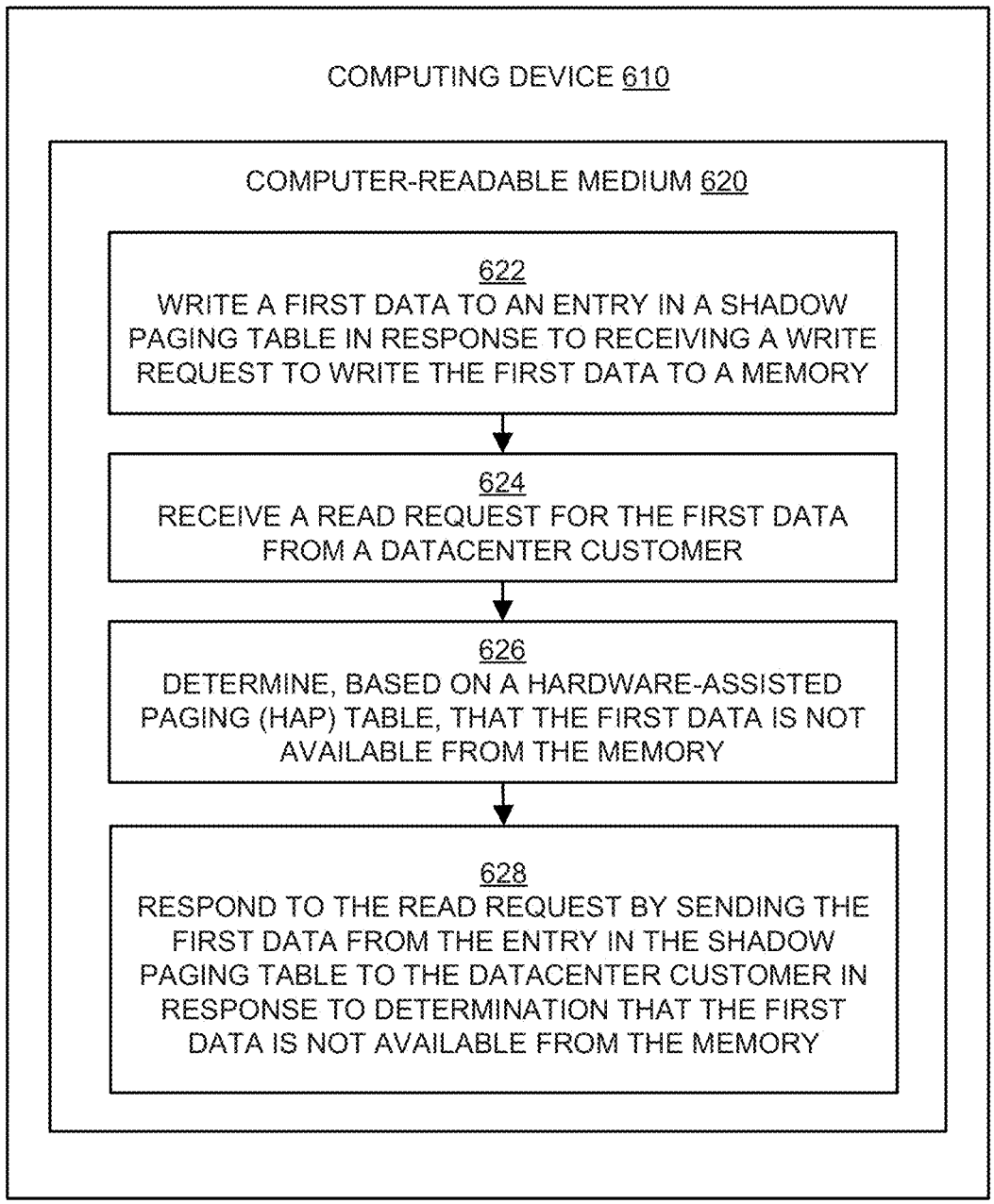
FIG. 6 is a flow diagram illustrating an example method for masking memory deduplication at a datacenter that may be performed by a computing device such as the computing device in FIG. 5.

FIG. 6 is a flow diagram illustrating an example method for masking memory deduplication at a datacenter that may be performed by a computing device such as the computing device in FIG. 5, arranged in accordance with at least some embodiments described herein.

Example methods may include one or more operations, functions or actions as illustrated by one or more of blocks 622, 624, 626, and/or 628, and may in some embodiments be performed by a computing device such as the computing device 500 in FIG. 5. The operations described in the blocks 622-628 may also be stored as computer-executable instructions in a computer-readable medium such as a computer-readable medium 620 of a computing device 610.

An example process for masking memory deduplication at a datacenter may begin with block 622, "WRITE A FIRST DATA TO AN ENTRY INA SHADOW PAGING TABLE IN RESPONSE TO RECEIVING A WRITE REQUEST TO WRITE THE FIRST DATA TO A MEMORY", where a VMM (e.g., the VMM 212) may write a received first data to an entry in a shadow paging table before writing it to a memory, as described above. In some embodiments, the first data may be a modified version of data already stored in the memory.

Block 622 may be followed by block 624, "RECEIVE A READ REQUEST FOR THE FIRST DATA FROM A DATACENTER CUSTOMER", where the VMM may receive a read request for the first data from a datacenter customer (e.g., a VM at the datacenter). The VMM may receive the read request before the VMM has had a chance to write the first data from the shadow paging table to the memory, as described above.

Block 624 may be followed by block 626, "DETERMINE, BASED ON A HARDWARE-ASSISTED PAGING (HAP) TABLE, THAT THE FIRST DATA IS NOT AVAILABLE FROM THE MEMORY", where the VMM may use a HAP table to determine whether the first data is available from the memory, as described above. For example, the VMM may not have had the opportunity to write the first data from the shadow paging table to the memory. As a result, the HAP table may not include a reference to the first data, and the VMM may determine based on the HAP table that that first data is not available from the memory.

Finally, block 626 may be followed by block 628, "RESPOND TO THE READ REQUEST BY SENDING THE FIRST DATA FROM THE ENTRY IN THE SHADOW PAGING TABLE TO THE DATACENTER CUSTOMER IN RESPONSE TO DETERMINATION THAT THE FIRST DATA IS NOT AVAILABLE FROM THE MEMORY", where the VMM, upon the determination that the first data is not available from the memory performed in block 626, instead sends the first data from the entry in the shadow paging table, as described above.

FIG. 7 illustrates a block diagram of an example computer program product, arranged in accordance with at least some embodiments described herein.

In some examples, as shown in FIG. 7, a computer program product 700 may include a signal bearing medium 702 that may also include one or more machine readable instructions 704 that, when executed by, for example, a processor may provide the functionality described herein. Thus, for example, referring to the processor 504 in FIG. 5, the virtual machine manager 522 may undertake one or more of the tasks shown in FIG. 7 in response to the instructions 704 conveyed to the processor 504 by the medium 702 to perform actions associated with masking memory deduplication as described herein. Some of those instructions may include, for example, to write a first data to an entry in a shadow paging table in response to receiving a write request to write the first data to a memory, to receive a read request for the first data from a datacenter customer, to determine, based on a hardware-assisted paging (HAP) table, that the first data is not available from the memory, and/or to respond to the read request by sending the first data from the entry in the shadow paging table to the datacenter customer in response to determination that the first data is not available from the memory, according to some embodiments described herein.

In some implementations, the signal bearing media 702 depicted in FIG. 7 may encompass computer-readable media 706, such as, but not limited to, a hard disk drive (HDD), a solid state drive (SSD), a Compact Disc (CD), a Digital Versatile Disk (DVD), a digital tape, memory, etc. In some implementations, the signal bearing media 702 may encompass recordable media 708, such as, but not limited to, memory, read/write (R/W) CDs, R/W DVDs, etc. In some implementations, the signal bearing media 702 may encompass communications media 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RE signal bearing medium, where the signal bearing media 702 is conveyed by the wireless communications media 710 (e.g., a wireless communications medium conforming with the IEEE 802.11 standard).

According to some examples, method may be provided to mask memory deduplication in a datacenter, An example method may include writing a first data to an entry in a shadow paging table in response to receiving a write request to write the first data and receiving a read request for the first data from a datacenter customer. The method may further include determining that the first data is not available from a memory based on a hardware assisted paging (HAP) table and sending the first data from the entry in the shadow paging table to the datacenter customer in response to determination that the first data is not available from the memory.

According to some embodiments, the HAP table may be configured to map to the memory and the memory may be configured to store deduplicated data. The method may further include opportunistically updating the HAP table and the memory to include the first data and/or deleting the entry in the shadow table after the updating. The method may further include receiving another read request for a second data from another datacenter customer, determining that the second data is available from the memory based on the HAP table, and responding to the other read request by sending the second data from the memory to the other datacenter customer in response to determination that the second data is available from the memory. The method may further include using the HAP table to retrieve the second data from the memory before sending the second data.

According to other embodiments, the first data may be a modified version of deduplicated data available from the memory. Receiving the write request and/or receiving the read request may include receiving the write request or the read request from a virtual machine associated with the datacenter customer. Receiving the read request may include receiving the read request following receipt of the write request. The first data may be data associated with an operating system and/or data associated with an application.

According to other examples, a virtual machine manager (VMM) may be provided to mask memory deduplication in a datacenter. The VMM may include a processing module and a memory configured to store a shadow paging table and a hardware-assisted paging (HAP) table and coupled to the processing module. The processing module may be configured to receive a write request to write a first data, write the first data to an entry in the shadow paging table, receive a read request for the first data from a datacenter customer, and determine, based on the HAP table, that the first data is not available from a memory. The processing module may be further configured to respond to the read request by sending the first data from the entry in the shadow paging table to the datacenter customer in response to determination that the first data is not available from the memory.

According to some embodiments, the HAP table may be configured to map to the memory and the memory may be configured to store deduplicated data. The processing module may be further configured to opportunistically update the HAP table and the memory to include the first data and/or delete the entry in the shadow table after the updating.

According to further examples, a system may be provided to mask memory deduplication. The system may include at least one virtual machine (VM) operable to be executed on one or more physical machines, a memory configured to store deduplicated data, a memory configured to store a shadow paging table and a hardware-assisted paging (HAP) table, and a controller. The controller may be configured to receive a write request to write a first data to the memory, write the first data to an entry in the shadow paging table, receive a read request for the first data from a customer, and determine, based on the HAP table, that the first data is not available from the memory. The controller may further be configured to respond to the read request by sending the first data from the entry in the shadow paging table to the customer in response to determination that the first data is not available from the memory.

According to some embodiments, the HAP table may be configured to map to the memory. The controller may be further configured to opportunistically update the HAP table and the memory to include the first data and/or delete the entry in the shadow table after the updating. The controller may be further configured to receive another read request for a second data from another customer, determine that the second data is available from the memory based on the HAP table, and respond to the other read request by sending the second data from the memory to the other customer in response to determination that the second data is available from the memory. The controller may be further configured to use the HAP table to retrieve the second data from the memory before sending the second data.

According to other embodiments, the first data may be a modified version of deduplicated data available from the memory. Receiving the write request and/or receiving the read request may include receiving the write request or the read request from a virtual machine associated with the customer. Receiving the read request may include receiving the read request following receipt of the write request. The first data may be data associated with an operating system and/or data associated with an application.

According to yet further examples, a computer readable medium may store instructions for masking memory deduplication in a datacenter. The instructions may include writing a first data to an entry in a shadow paging table in response to receiving a write request to write the first data and receiving a read request for the first data from a datacenter customer. The instructions may further include determining that the first data is not available from a memory based on a hardware-assisted paging (HAP) table and sending the first data from the entry in the shadow paging table to the datacenter customer in response to determination that the first data is not available from the memory.

According to some embodiments, the HAP table may be configured to map to the memory and the memory may be configured to store &duplicated data. The instructions may further include opportunistically updating the HAP table and the memory to include the first data and/or deleting the entry in the shadow table after the updating. The instructions may further include receiving another read request for a second data from another datacenter customer, determining that the second data is available from the memory based on the HAP table, and responding to the other read request by sending the second data from the memory to the other datacenter customer in response to determination that the second data is available from the memory. The instructions may further include using the HAP table to retrieve the second data from the memory before sending the second data.

According to other embodiments, the first data may be a modified version of deduplicated data available from the memory. Receiving the write request and/or receiving the read request may include receiving the write request or the read request from a virtual machine associated with the datacenter customer. Receiving the read request may include receiving the read request following receipt of the write request. The first data may be data associated with an operating system and/or data associated with an application.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

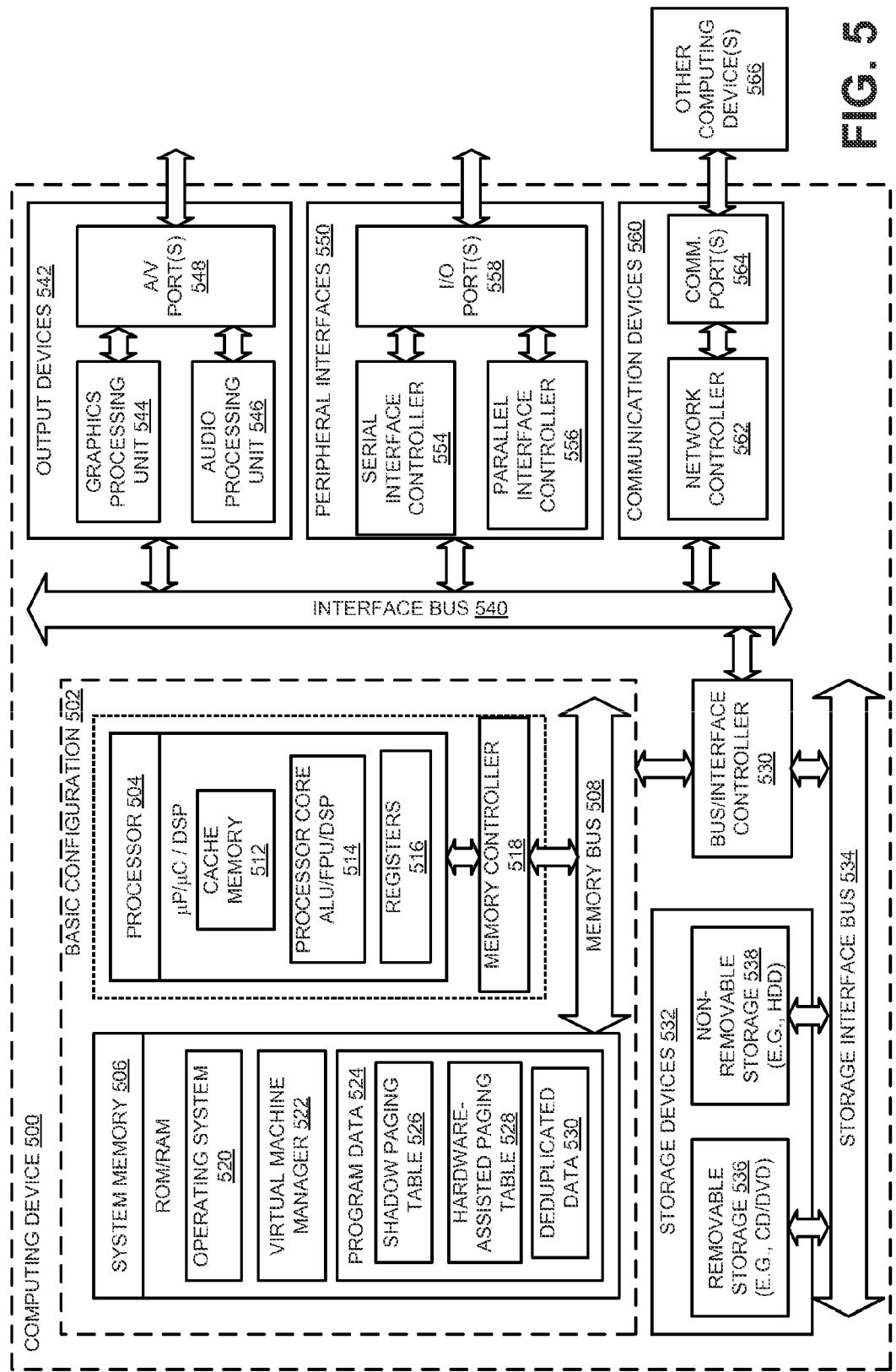

What is claimed is:

1. A method to mask memory deduplication in a datacenter, the method comprising:
   in response to receiving a write request to write a first data to a memory, writing the first data to an entry in a temporary shadow paging table;
   updating a hardware-assisted paging (HAP) table and the memory to include the first data from the entry in the temporary shadow paging table based on: a write access time and a particular size limit of the temporary shadow paging table;
   receiving a read request for the first data from a datacenter customer;
   determining, based on the HAP table, an availability of the first data from the memory;
   in response to a determination that the first data is available from the memory,
     responding to the read request by sending the first data from an entry in the memory to the datacenter customer; and
   in response to a determination that the first data is not available from the memory,
     triggering a fault, and
     responding to the fault by sending the first data from the entry in the temporary shadow paging table to the datacenter customer.

2. The method of claim 1, wherein:
   the HAP table is configured to map to the memory; and
   the memory is configured to store deduplicated data.

3. The method of claim 1, further comprising deleting the entry in the temporary shadow paging table after the updating.

4. The method of claim 1, further comprising:
   receiving another read request for a second data from another datacenter customer;
   determining, based on the HAP table, that the second data is available from the memory; and
   in response to the determination that the second data is available from the memory, responding to the another read request by sending the second data from the memory to the another datacenter customer.

5. The method of claim 4, further comprising using the HAP table to retrieve the second data from the memory before sending the second data.

6. The method of claim 1, wherein the first data includes a modified version of deduplicated data available from the memory.

7. The method of claim 1, wherein at least one of receiving the write request and receiving the read request comprises receiving the write request or the read request, respectively, from a virtual machine associated with the datacenter customer.

8. The method of claim 1, wherein receiving the read request comprises receiving the read request following the receipt of the write request.

9. The method of claim 1, wherein the first data includes one of data associated with an operating system and data associated with an application.

10. A server configured to mask memory deduplication in a datacenter, the server comprising:
    a communication interface configured to communicate with a plurality of virtual machines executed on one or more servers;
    a memory implemented in an integrated circuit (IC) and configured to store a temporary shadow paging table, a hardware-assisted paging (HAP) table, and deduplicated data, wherein the HAP table is configured to map to the memory; and
    a processor implemented in an integrated circuit (IC) coupled to the memory and the communication interface, wherein the processor is configured to:
      receive a write request to write a first data to the memory;
      write the first data to an entry in the temporary shadow paging table;
      update the HAP table and the memory to include the first data from the entry in the temporary shadow paging table based on at least one of: a write access time and a particular size limit of the temporary shadow paging table;
      receive a read request for the first data from a datacenter customer;
      determine, based on the HAP table, an availability of the first data from the memory;
      in response to a determination that the first data is available from the memory,
        respond to the read request by sending the first data from an entry in the memory to the datacenter customer; and in response to a determination that the first data is not available from the memory,
trigger a fault, and
respond to the fault by sending the first data from the entry in the temporary shadow paging table to the datacenter customer.

11. The server of claim 10, wherein the processor is further configured to delete the entry in the temporary shadow paging table after the HAP table is updated.

12. A system configured to mask memory deduplication, the system comprising:
at least one virtual machine (VM) operable to be executed on one or more physical machines;
a first memory implemented in an integrated circuit (IC) and configured to store deduplicated data;
a second memory implemented in an integrated circuit (IC) and configured to store a temporary shadow paging table and a hardware-assisted paging (HAP) table, wherein the HAP table maps to the first memory; and
a controller implemented in an integrated circuit (IC) and configured to:
receive a write request to write a first data to the first memory;
write the first data to an entry in the temporary shadow paging table;
update the HAP table and the first memory to include the first data from the entry in the temporary shadow paging table based on at least one of: a write access time and a particular size limit of the temporary shadow paging table;
receive a read request for the first data from a datacenter customer;
determine, based on the HAP table, an availability of the first data from the first memory;
in response to a determination that the first data is available from the first memory,
respond to the read request by sending the first data from an entry in the first memory to the datacenter customer; and
in response to a determination that the first data is not available from the first memory,
trigger a fault, and
respond to the fault by sending the first data from the entry in the temporary shadow paging table to the datacenter customer.

13. The system of claim 12, wherein the controller is further configured to delete the entry in the temporary shadow paging table after the HAP table is updated.

14. The system of claim 12, wherein the controller is further configured to:
receive another read request for a second data from another customer;
determine, based on the HAP table, that the second data is available from the first memory; and
in response to the determination that the second data is available from the first memory, respond to the another read request by sending the second data from the first memory to the another customer.

15. The system of claim 14, wherein the controller is further configured to use the HAP table to retrieve the second data from the first memory before sending the second data.

16. The system of claim 12, wherein the first data includes a modified version of a deduplicated data available from the first memory.

17. The system of claim 12, wherein at least one of the write request and the read request are received from the at least one virtual machine, which is associated with the customer.

18. The system of claim 12, wherein the read request received shortly after the write request is received.

19. The system of claim 12, wherein the first data includes one of a data associated with an operating system and a data associated with an application.

* * * * *

UNITED STATES PATENT AND TRADEMARK OFFICE
CERTIFICATE OF CORRECTION

| | |
|---|---|
| PATENT NO. | : 9,619,168 B2 |
| APPLICATION NO. | : 14/376125 |
| DATED | : April 11, 2017 |
| INVENTOR(S) | : Kruglick |

It is certified that error appears in the above-identified patent and that said Letters Patent is hereby corrected as shown below:

In the Drawings

Replace sheet 5 of 7 with the attached sheet 5 of 7.

In the Specification

In Column 1, Line 7, delete "§371" and insert -- § 371 --, therefor.

In Column 1, Line 35, delete "deduplication" and insert -- deduplication in --, therefor.

In Column 2, Line 14, delete "&duplication" and insert -- deduplication --, therefor.

In Column 2, Line 47, delete "may he" and insert -- may be --, therefor.

In Column 3, Line 66, delete "&duplication" and insert -- deduplication --, therefor.

In Column 8, Line 60, delete "e.g.," and insert -- (e.g., --, therefor.

In Column 9, Line 37, delete "INA" and insert -- IN A --, therefor.

In Column 10, Line 46, delete "RE signal" and insert -- RF signal --, therefor.

In Column 10, Line 52, delete "datacenter," and insert -- datacenter. --, therefor.

In Column 12, Line 29, delete "&duplicated" and insert -- deduplicated --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,619,168 B2

In Column 13, Line 19, delete "e.g.," and insert -- (e.g., --, therefor.

In Column 14, Line 33, delete "interactable" and insert -- logically interactable --, therefor.